Sept. 15, 1925.
O. SALBERG
1,554,037
HARROW ATTACHMENT FOR SULKY PLOWS
Filed Nov. 7, 1924
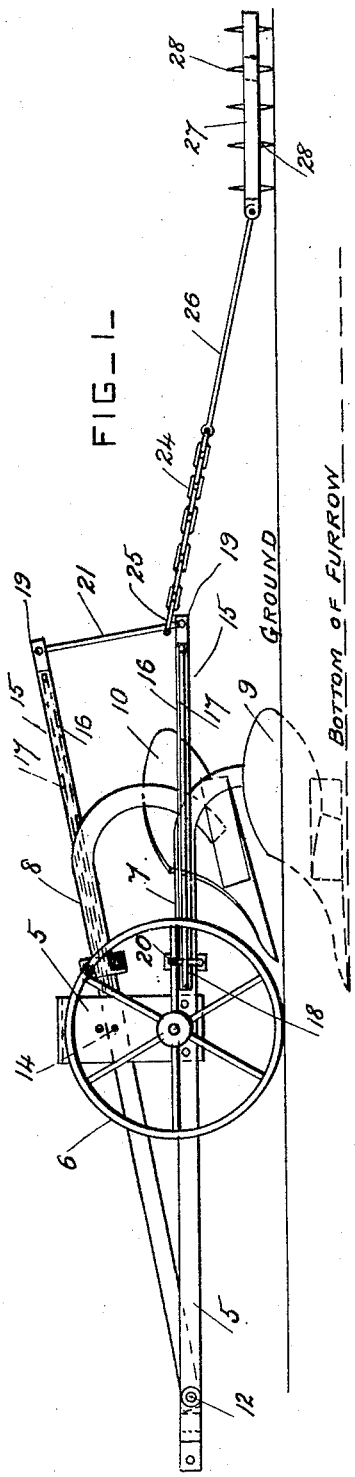
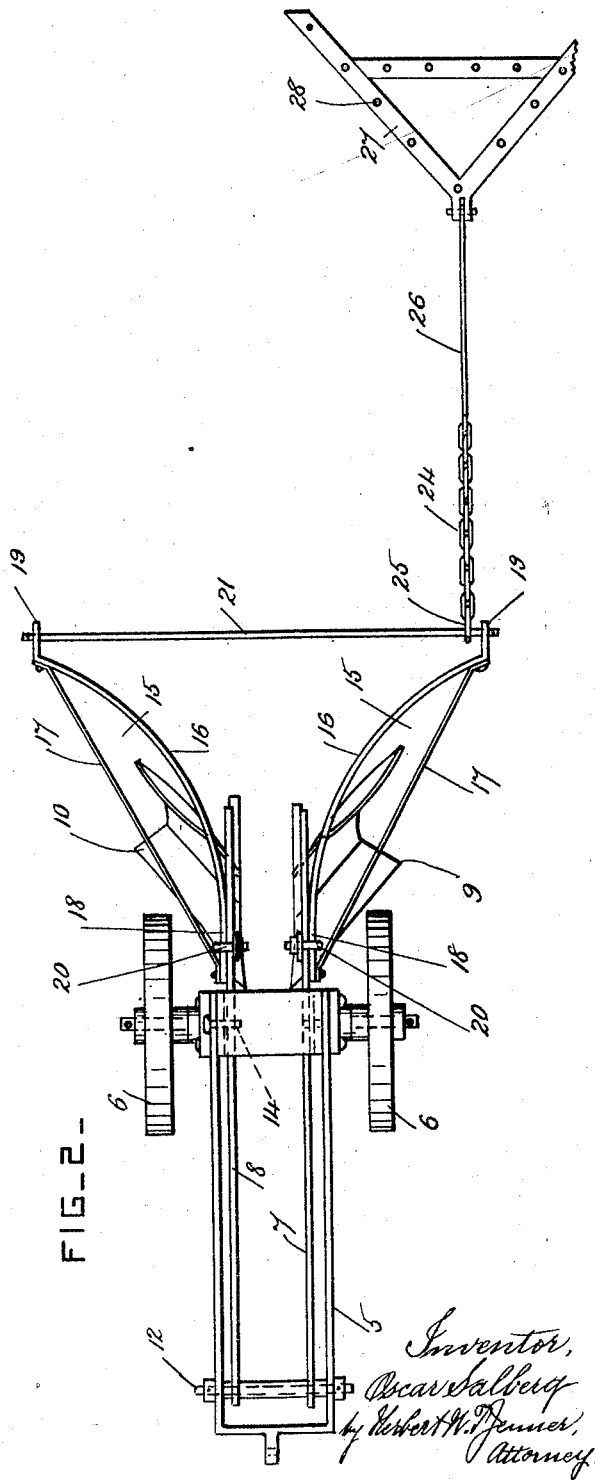

Patented Sept. 15, 1925.

1,554,037

UNITED STATES PATENT OFFICE.

OSCAR SALBERG, OF GREELEY, COLORADO.

HARROW ATTACHMENT FOR SULKY PLOWS.

Application filed November 7, 1924. Serial No. 748,374.

*To all whom it may concern:*

Be it known that I, OSCAR SALBERG, a citizen of the United States, residing at Greeley, in the county of Weld and State of Colorado, have invented certain new and useful Improvements in Harrow Attachments for Sulky Plows, of which the following is a specification.

This invention relates to two-way sulky plows; and it consists of a harrow attached to the plow beams as hereinafter fully described and claimed, so that the ground is harrowed as fast as it is plowed.

In the drawings, Figure 1 is a side view in outline of a two-way sulky plow provided with a harrow attachment according to this invention. Fig. 2 is a plan view of the same.

The sulky plow is of any approved make, and in the machine shown a main frame 5 is provided and is mounted on ground wheels 6. Two plow beams 7 and 8 are pivoted to the frame at their front ends, and have plows 9 and 10 at their rear ends, formed right and left respectively. The pivoted connection shown is a pin 12, but the beams may be pivoted in the well known manner so that they will shift back and forth according to which plow is at work. The plows are raised and lowered alternately according to the direction of the machine, which is turned around at each end of the field. The plow not at work, as shown in Fig. 1, is raised clear of the ground, and is supported in any approved way, such as by a pin 14 on the frame. The novel harrow attachment hereinafter described is adapted to be applied to all standard makes of two-way plows without altering them or drilling any additional holes in them.

According to this invention two bow-shaped frames 15 are provided. Each frame is formed of a curved rear bar 16, a foot 18 and a straight brace 17. The bar 16 has the foot 18 at its front end, and the front end of the brace is secured to the front end of the foot.

The rear end of the brace is secured to the rear end of the bar, and the bar has a rearwardly projecting lug 19 at its rear end. The frames 15 are both alike, but they are secured to the plow beams so that they project rearwardly and laterally in opposite directions. Each foot 18 is secured to a plow beam by a clamp 20, so that the frame can be attached to any plow beam without drilling holes in it, and can be removed and replaced at will. The feet 18 are secured to the beams adjacent to the axis of the ground wheels, the exact position being different for different makes of two-way plows. The frames 15 project rearwardly and outwardly at an angle to each other.

A cross rod 21 is secured between the two lugs 19, its end portions being inserted in holes in the lugs. This cross rod is arranged at an angle to the horizontal when the machine is at work, as the frames 15 are raised and lowered simultaneously with the plow beams. A chain 24 has a link or eye 25 at its front end which is slidable on the cross rod 21, and a draft rod 26 is attached to the rear end of the chain. The harrow 27 is preferably triangular in form, and it has two series of harrow teeth 28, one series projecting upwardly and the other downwardly. The front end of the harrow is pivoted to the rear end of the rod 26, and the object of the rod is to provide a smooth attachment that the harrow teeth do not catch in when the harrow is being turned over and is out of place. The chain gives the necessary flexibility which a rod would not give.

The eye of the chain always gravitates and slides to the lower end portion of the cross rod, so that the harrow is drawn over the ground turned up at the side of the machine.

When the machine arrives at the end of the field it is turned around, and the position of the two plows is reversed. This tilts the cross rod in the opposite direction, and the eye of the chain slides along it so that the harrow will work in connection with the plow which is now lowered. The harrow turns over automatically as the machine turns around, and it can be turned over by hand if it fails to do so.

What I claim is:

1. The combination, with a wheeled sulky plow provided with two pivoted plow beams having plows adapted for alternate use, of a harrow attachment comprising two similar diverging frames, clamping devices securing the front ends of the said frames to the respective plow beams, a cross rod extending between the rear ends of the said frames, the said clamping devices being detachable and operating to clamp the frames to the plow beams at various predetermined points and to support the said frames and cross rod wholly from the plow beams, and a harrow provided with a draft device which is slidable on the said cross rod.

2. The combination, with a wheeled sulky plow provided with two pivoted plow beams having plows adapted for alternate use, of a harrow attachment comprising two similar frames each formed of an arcuate bar and a straight brace secured across the chord of the arcuate bar between its end portions, detachable clamping devices securing the front end portions of the said frames against the outer sides of the respective plow beams, a cross rod extending between the rear end portions of the said frames, said frames and cross rod being wholly supported by the said clamping devices and plow beams, and a harrow provided with a draft device which is slidable on the said rod.

3. A sulky plow and harrow attachment as set forth in claim 1, the draft device of the harrow being formed of a rod pivoted to the harrow and a chain connected to the rod and having an eye which is slidable on the cross rod.

In testimony whereof I have affixed my signature.

OSCAR SALBERG.